(No Model.) 3 Sheets—Sheet 1.
C. K. WELCH.
VALVE FOR PNEUMATIC TIRES.
No. 503,300. Patented Aug. 15, 1893.
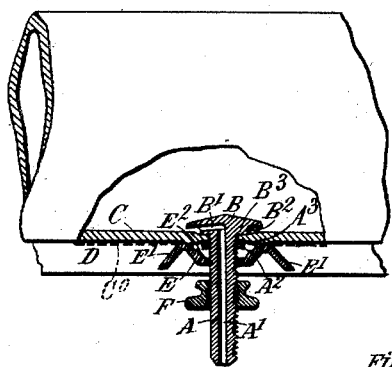
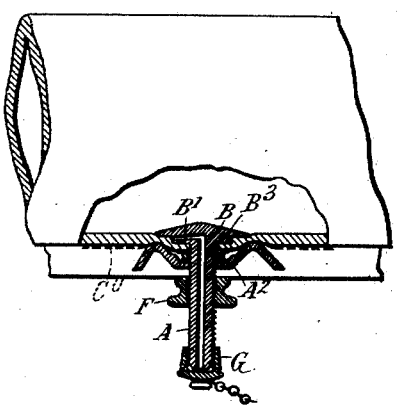
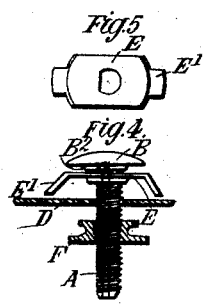
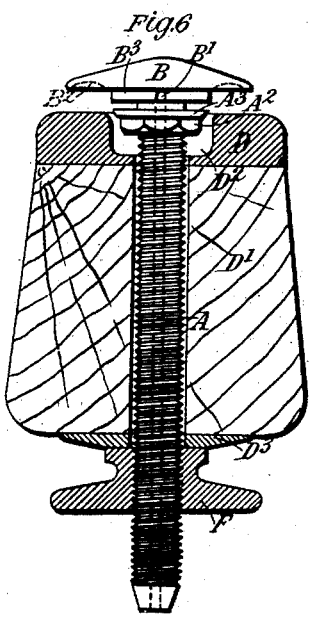
Witnesses:
James N. Catlow
Ernest Hopkinson
Inventor
Charles K. Welch
by Duncan & Page
Attorneys (No Model.) 3 Sheets—Sheet 2.
C. K. WELCH.
VALVE FOR PNEUMATIC TIRES.
No. 503,300. Patented Aug. 15, 1893.
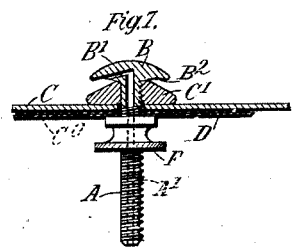
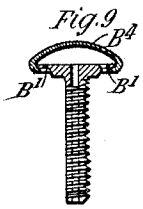
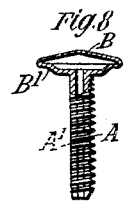
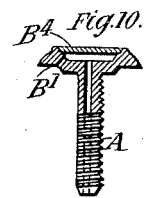
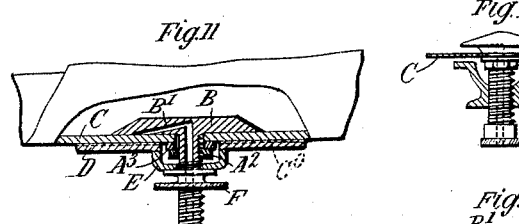
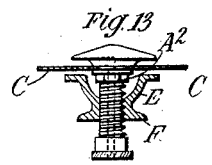
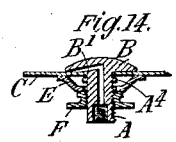
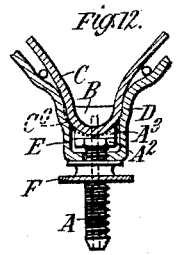
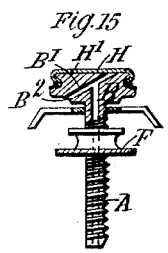
Witnesses:
James N. Catlow
Ernest Hopkinson
Inventor
Charles K. Welch
by Duncan & Page
Attorneys.

(No Model.) 3 Sheets—Sheet 3.
C. K. WELCH.
VALVE FOR PNEUMATIC TIRES.
No. 503,300. Patented Aug. 15, 1893.
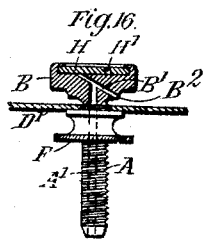
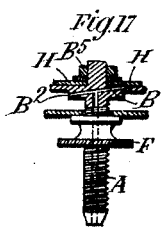
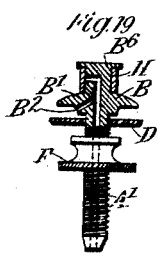
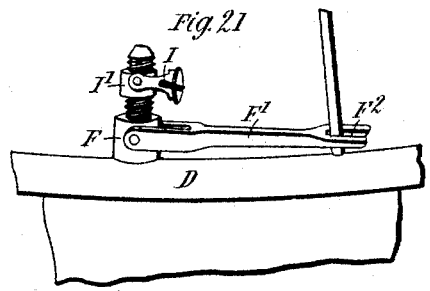
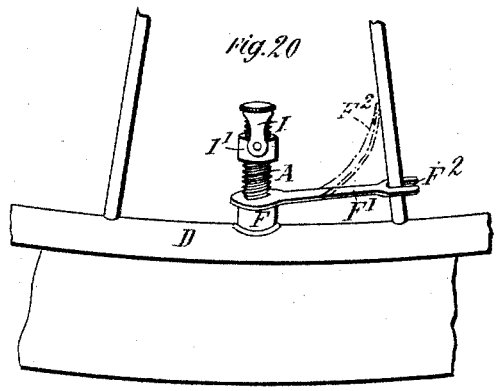
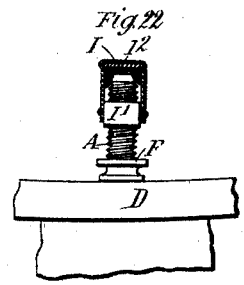
Witnesses:
James N. Catlow
Ernest Hopkinson
Inventor
Charles K. Welch
by Duncan & Page
Attorneys

UNITED STATES PATENT OFFICE.

CHARLES KINGSTON WELCH, OF COVENTRY, ENGLAND, ASSIGNOR TO THE PNEUMATIC TYRE AND BOOTH'S CYCLE AGENCY, LIMITED, OF DUBLIN, IRELAND.

VALVE FOR PNEUMATIC TIRES.

SPECIFICATION forming part of Letters Patent No. 503,300, dated August 15, 1893.

Application filed May 2, 1893. Serial No. 472,808. (No model.)

*To all whom it may concern:*

Be it known that I, CHARLES KINGSTON WELCH, engineer, a subject of the Queen of Great Britain, and a resident of Coventry, England, have invented certain new and useful Improvements in Valves, of which the following is a specification, reference being had to the accompanying drawings.

My invention relates to valves and has for its object to provide a valve which shall be capable of being made very small and compact and also be simple and easy of construction.

My improved valves are specially suited for use with pneumatic or air-inflated tires.

An important feature of my invention relates to the means whereby air is entirely prevented from escaping and pressure is maintained in the tire. My improved valve can moreover be operated so as to let the air out of or deflate the tire when desired.

According to my invention I provide a cylindrical part or stem having a flanged end forming head. The said cylindrical part is provided with an axial hole which however is not continued straight through the head but is connected by one or more branches with an orifice or orifices in that face of the head which is in contact with the wall of the tube. When the valve is fitted to a vessel into which air is to be pumped through the valve, the head of the said valve is inside the vessel, the cylindrical stem being pushed through a hole in the outer wall of the said vessel provision being made for preventing leakage through the hole around the valve stem. It is evident that if the flanged head of the valve is by suitable means brought tight against the side of the vessel air cannot be admitted through the axial hole since the entrance thereof in the head is closed by the side of the vessel. Moreover if the head of the valve is pushed away from the side of the vessel air can enter or leave the same, the entrance to the axial hole being no longer closed.

In the accompanying drawings: Figure 1 is a sectional view showing one form of my improved valve applied to a pneumatic tire, the valve being open. Fig. 2 is a similar view to Fig. 1, the valve being closed. Fig. 3 is a detail view of a part of the valve shown in Figs. 1 and 2. Fig. 4 is a sectional view of another form of valve. Fig. 5 is a detail view of part of the same. Fig. 6 is a sectional view showing one form of my improved valve applied to a pneumatic tire fitted on the wooden or other felly of a heavy vehicle. Figs. 7 to 19 are sectional views showing various forms or modifications of my improved valve. Figs. 20 to 22 are views showing modifications of parts of my improved valve.

Like letters of reference denote similar parts in all the drawings.

Referring now to Figs. 1 to 3, A is the cylindrical part or stem of the valve, B the head of the same; C is the air tube of a pneumatic tire, D the rim of the wheel. The valve stem has an axial hole A' which connects with a branch channel B' in the head. The interior flange of the head is recessed or grooved as shown at $B^2$ thus forming a shoulder $B^3$ and the branch channel B opens into the air at some point in the recess or groove. The wall of the air tube is pierced with a hole through which the valve stem passes and the part of the tube around and adjacent to the said hole is gripped between the shoulder $B^3$ and a nut $A^2$ screwed on the valve stem. A piece of canvas or other suitable fabric $C^0$ is solutioned or otherwise secured to the air tube at the part adjacent to the valve stem to prevent the said air tube from stretching. A washer $A^3$ is preferably inserted between the nut $A^2$ and the wall of the air tube. E is a washer shown in plan in Fig. 3 capable of sliding on the valve stem. The said washer is prevented from turning in its place on the rim by means of the wings E' which are pressed into and engage with the sides of the central channel in the rim when such a channel is provided, or the said washer may be soldered or brazed or secured to the rim by other suitable means. The valve is also prevented from turning in the hole in the washer E by being made of a D-shape in cross section the hole in the washer being made of a similar shape. The valve is thereby prevented from turning when in its place on the rim. The washer E is moreover suitably countersunk as at $E^2$ to afford space for the nut $A^2$ and washer $A^3$ when pushed toward the head of the valve for a purpose hereinafter explained. F is a nut adapted to screw up and down the valve stem and G is a cap for screwing on the end thereof to prevent the possibility of air escaping when the valve is in use, and also to keep out dirt and dust.

The operation of my improved valve is as follows, that is to say: The nut F is screwed back away from the rim a short distance, the inflating tube from the pump is screwed on the end of the valve stem the cap G having been previously removed therefrom. The valve is now pushed into the tire until it occupies some such position as that shown in Fig. 1. When the pump is worked air is driven into the tire through the axial hole A' and branch B'. When the tire is pumped sufficiently hard, the nut F is screwed against the rim. This draws the valve out bringing the head B toward the washer E which is kept in place by the rim. The nut $A^2$ and washer $A^3$ lodge in the countersunk portion $E^2$ of the washer E and the projecting part of said washer forces the wall of the air tube against the head of the valve thus closing the entrance to the branch channel B' as shown in Fig. 2. The inflating tube from the pump is now disconnected and the cap G screwed on in its place. When the tire is required to be deflated the cap G is taken off and the nut F screwed out. The valve is then pushed into the tire until it occupies the position shown in Fig. 1, whereupon the air escapes from the tire through the branch channel B' and axial hole A'. It will be remarked that the pressure of air inside the tire will tend to force the wall of the air tube away from the head of the tire when the valve is pushed in, and in a similar manner the air pressure forces the head B against the wall of the air tube and thus tends to maintain the valve closed until the same is forcibly pushed in.

In all the valves shown in the remainder of the drawings which valves differ merely in constructional details from that shown in Figs. 1 and 2 the principle by which the deflating of the tire or receptacle is accomplished is the same namely through an aperture in the internal flange of the head of the valve, and it is only in Figs. 15 to 19 that I show modifications in that part of the valve which operates as a non-return valve during inflation. The operation of the valve shown in these figures will be hereinafter fully described.

In Fig. 4 a valve is shown wherein I dispense with the nut $A^2$ and washer $A^3$ the air tube of the tire being held between the head of the valve B and a shoulder formed on the valve stem. The washer E which is shown in plan in Fig. 5 is forced against the head of the valve when the nut F is screwed up outside the rim D.

In Fig. 6 I show how a valve of a kind similar to those above described may be conveniently fitted to a wheel of a heavy vehicle. D is in this case the iron rim of the wheel fixed on a wooden felly D'. The said rim is countersunk as shown at $D^2$ and acts in the same manner as the washer E described above with reference to Fig. 1 or the rim D may be plain and a washer used on the top thereof similar to the washer shown in Fig. 1. I prefer to secure a washer $D^3$ on the inside of the felly having a D-shaped hole through which the D-shaped stem of the valve passes to prevent the same turning in the felly when the nut F is screwed up and down or I may use other suitable means for accomplishing the same object.

In Fig. 7, C' is a washer of conical, hemispherical or other suitable shape which is placed inside, or may be secured to the air tube so that when the nut F is screwed up the said washer flattens out and effectually closes the entrance to the channel B'.

In Fig. 8 the stem and head of the valve are stamped out of one piece of metal and in this case the head of the valve is hollow the channel B' being merely an orifice in the flange in the head. In Fig. 9 the head is also hollow the top thereof being formed by spinning a disk of metal $B^4$ round the same so as to form a cap.

In Fig. 10 the cap is formed by securing a disk $B^4$ by soldering or any other suitable means in a recess formed in the top of the head.

In the designs illustrated by way of example in Figs. 8, 9 and 10, I may make more than one channel B' leading into the hollow head of the valve from the exterior if desired.

Figs. 11 and 12 show a form which I have found especially suitable for pneumatic tires fitted to rims or wheels having a rounded channel in the bottom thereof or for applying to metal tubes or the like. Fig. 11 is a longitudinal section and Fig. 12 a transverse section of the valve and part of the air chamber or receptacle. The head of the valve is then semi-cylindrical in shape, the channel B, preferably running longitudinally along the rim or tube or the like. The countersunk washer E is placed outside the rim or the nut F may be sufficiently countersunk to serve as the washer as shown in Fig. 13 hereinafter described.

In Figs. 13 and 14 valves which are more especially suitable for use with air cushions or other similar receptacles are shown. In Fig. 13 a nut $A^2$ is used to secure the valve to the wall C of the receptacle as previously described with reference to Fig. 1. The washer E is made in one piece with the nut F as shown. In Fig. 14 the valve is secured to the receptacle in the manner hereinabove described with reference to Fig. 4, that is to say by means of the shoulder $A^4$, and the nut F and washer E are separate. When the receptacle is the air tube of a pneumatic tire the valve stem in these last cases does not pass through the rim, but the valve is fitted to a part of the tire outside the rim.

Referring now to Figs. 15 to 19 the valve is made with a displaceable portion of rubber or similar material which is displaced while air is being forced in from the pump but which recloses the air entrance when the pressure from the pump is reduced. The operation of the valve when the receptacle is required to be deflated is however the same as hereinabove explained with reference to the other figures of the drawings. In Figs. 15 to 18 the branch tube B' extends through the head, one end opening in the interior flange of the head as at B² the other end opening out in the top or side of the head and being covered with the displaceable rubber part H. In Fig. 15, H is a rubber cap having a hole H' at a part not opposite the entrance to the channel B'. The said cap is kept in position by a wire and groove in the head B. In Fig. 16 H is a disk of rubber secured by its edges to the flat top of the head and having a hole H' as in Fig. 15. In Fig. 17 the rubber part takes the form of a washer H secured to the head by a nut B⁵. In Fig. 18 the upper entrance to the channel B' is in a groove B⁶ turned on the side of the head and a round rubber ring H is placed in the said groove. Fig. 19 shows a modification of Fig. 18 in which the groove B⁶ consists of a cylindrical part of the head, the rubber ring H becoming a tube as shown. It will be readily understood that the india rubber portions of these valves can be easily deformed and displaced to admit air to the tire but will not owing to their elasticity and the pressure of the confined air allow the air to escape. The deflation of the tire is accomplished as hereinbefore explained with reference to the other figures of the drawings.

In order to prevent the nut F from unscrewing when screwed tight in position against the rim I sometimes secure thereto a spring arm F' which is forked at the end as at F² so as to engage with one of the spokes of the wheel adjacent to the valve as shown in Fig. 20. When it is required to operate the nut the said arm is bent or sprung up as shown in dotted lines and then forms a convenient handle for turning the nut. In Fig. 21 the forked arm is shown rigid and pivoted on the nut F so as to be able to be placed out of engagement with the spokes.

Instead of using a screw cap on the end of the valve stem to prevent leakage therethrough I sometimes pivot the cap on a nut which can screw up and down the valve stem. This device is shown in section in Fig. 22 where I is the pivoted cap, I' the nut, and I² a leather or rubber disk to seal the opening when the cap is in use. When required to open the entrance to the air all that is necessary is to screw the nut up a short distance and then to tilt the cap off as shown in Fig. 21. The cap is thus not detached from the valve thereby avoiding the vexation and annoyance caused by the loss of the same which frequently occurs.

I have herein described my improved valves as designed for use with pneumatic tires but I wish it to be understood that I also apply them to other vessels and receptacles which are employed for containing air or other fluid under pressure, such vessels for instance as air cushions, life belts and many others. In many cases I alter the shape of the valve head in order to adapt it to the rim, felly or chamber it may be intended for.

I make my improved valve of any suitable material and it may lacquered, plated or otherwise treated so that corrosion of the parts or adhesion to the rubber air tube for instance, may be prevented.

What I claim is—

1. The combination, with a receptacle for containing fluid under pressure, of a valve the flanged head of which is placed inside the said receptacle and the stem of which projects through the wall thereof, the said stem being provided with an axial hole communicating with the interior of the receptacle by an orifice in that face of the head which comes in contact with the wall of the receptacle, and means for forcing the said wall against the said face of the head, substantially as, and for the purposes, set forth.

2. The combination, with the air tube of a pneumatic tire, of a valve constructed with a flanged head placed inside said air tube and a stem projecting through the wall of the air tube, said stem being provided with an axial hole which communicates with the interior of the air tube by an orifice in that face of the head which comes in contact with the wall of the air tube, and means for forcing the said wall of the air tube against the said face of the head, substantially as, and for the purposes, set forth.

3. The combination, with the air tube of a pneumatic tire, of a valve constructed with a flanged head placed inside said air tube and a stem projecting through the wall of the air tube, said stem being provided with an axial hole which communicates with the interior of the air tube by an orifice in that face of the head which comes in contact with the wall of the air tube, and by a second orifice in another part of the head which orifice is covered with a piece of elastic material adapted to be deformed when air is pumped into the air tube and which constitutes a non-return valve, and means for forcing the under side of the head against the wall of the air tube, substantially as described.

4. The combination, with the air tube of a pneumatic tire, of a valve constructed with a flanged head having an orifice in that face which comes in contact with the wall of the air tube, and a washer adapted to be pressed against the air tube and thus force the wall of said air tube against the said face of the valve head, substantially as, and for the purposes, specified.

5. The combination of the rim of a wheel, the air tube of a pneumatic tire secured thereto, a valve constructed with a flanged head having an orifice in that face which comes in contact with the wall of the air tube, a washer adapted to slide on the valve stem and a nut adapted to be screwed against the rim of the wheel and draw the valve head outward so as to clamp the wall of the air tube between the head of the valve and the washer on the stem, substantially as, and for the purposes, set forth.

6. The combination, of the rim of a wheel, the air tube of a pneumatic tire secured thereto, a valve constructed with a flanged head having an orifice in that face which comes in contact with the wall of the air tube, a washer adapted to slide on the valve stem, a nut adapted to be screwed against the rim of the wheel and draw the valve head outward so as to clamp the wall of the air tube between the head of the valve and the washer on the stem, and an arm secured to said nut and adapted to engage with a spoke of the wheel whereby the nut which operates the valve is prevented from slacking back when in use, as and for the purposes, specified.

In witness whereof I have hereunto set my hand this 11th day of April, 1893.

CHARLES KINGSTON WELCH.

Witnesses:
H. S. WESTWOOD,
THOMAS MARSTON.